March 22, 1932.  G. S. MESSINGER  1,850,937
DISTRIBUTOR
Filed Jan. 30, 1929
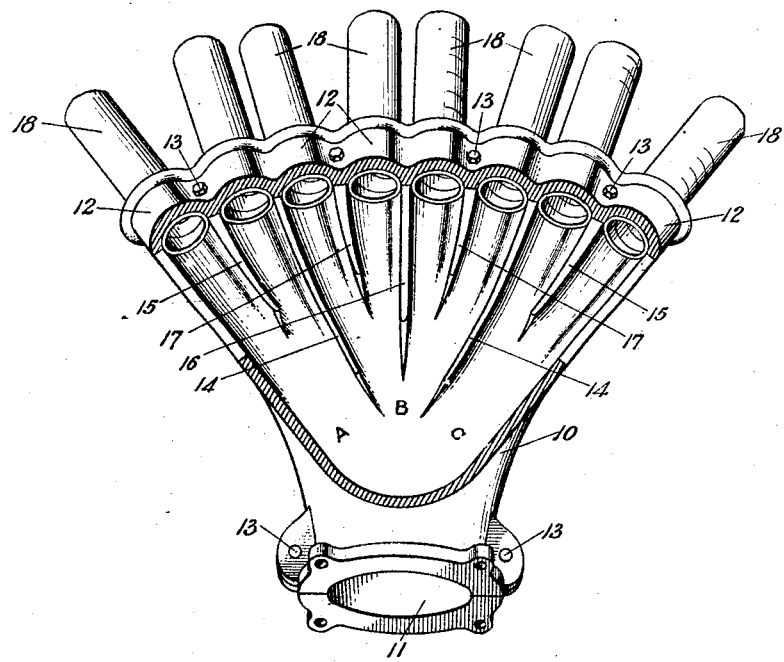
Inventor
George S. Messinger
By Emery, Booth, Janney & Varney
Attorneys Patented Mar. 22, 1932

1,850,937

UNITED STATES PATENT OFFICE

GEORGE S. MESSINGER, OF TATAMY, PENNSYLVANIA

DISTRIBUTOR

Original application filed November 28, 1927, Serial No. 236,326. Divided and this application filed January 30, 1929. Serial No. 336,225.

The object of this invention, is the provision of a novel distributing device particularly adapted for the uniform distribution and spraying of highly pulverulent materials, such as insecticide and fungicide powders, although it will be obvious that such distributor may be used to equally distribute to a plurality of conduits, any fluid stream carrying particles in suspension, such as an air stream carrying particles of atomized liquid insecticide, for example. Accordingly, the terms "dust" and "powder" hereinafter applied, are intended to be broadly construed. The invention aims generally, to improve such devices.

In the dusting of truck crops, such as potatoes, cotton and like plants, it is desirable to direct the dust blast against the plants from opposite sides, and in some instances from opposite sides and from above the plants. The equal distribution of the main powder stream to several conduits is therefore essential as is readily understandable by those skilled in the art, and my invention provides a construction capable of positively effecting such distribution.

The subject-matter of this invention has been divided and carved from my copending application Serial No. 236,326, filed November 28, 1927, patented June 11, 1929, Patent No. 1,716,970.

In the accompanying drawing illustrating one embodiment of my invention, I have shown a perspective view of the distributor partly broken away better to illustrate the construction.

As shown, the distributor 10 is preferably in the form of a fan-shaped casing having an inlet 11 at the small end and a plurality of outlets 12 at the peripheral edge. The casing 10 is advantageously formed of upper and lower half-sections bolted or otherwise held together, as at 13 and the inlet end 11 of the distributor is of a size and shape to correspond to the size and shape of the conduit to which it is to be applied. As shown in my above mentioned copending application, when this distributor is used with the fan-mixing type of powder blower it is preferable to apply the nozzle directly to the fan discharge outlet of the machine so that the stream entering the distributor will be as homogeneous as possible, but in any case, the fluid stream and its suspended particles will be substantially equally divided among the several outlets.

In multiple row plant dusting methods, it is necessary and desirable that each of the streams be of uniform pressure and dust content, and in order to accomplish this result a particular division and subdivision of the stream is provided. The dust laden stream entering the casing is first divided into several major streams which are in turn subdivided, the number of major streams and subdivisions thereof depending on the number of nozzles to be fed.

This is advantageously accomplished in the embodiment shown, which is provided with eight discharge outlets 12, by providing major dividers or partitions 14 to divide the casing into three major passages A, B, and C.

The major passages A, B, and C are of equal area, or substantially so, but the central major passage B, which is in direct line with the inlet 11 of the casing, receives a greater volume of dust than do the lateral major passages A and C. This factor is utilized to advantage in the construction of this distributor by feeding four tubes from the central major passage while only two tubes are fed from each of the lateral major streams.

Considering first the subdivision of the lateral major passages A and C it will be noticed from the drawing, that dividers 15 intersect the streams at a point somewhat closer to long partitions 14 than to the walls of the casing 10 opposite thereto. Thus the fact that the powder density is greater adjacent the walls 14 is considered and dividers 15 are so positioned as to divide each of major streams A and C into two feeder streams of equal dust content for their respective pairs of tubes.

The central major passage B is utilized to feed four tubes in this form of the invention. Being aligned with inlet 11, it may be equally divided into two sub-passages by medial partition, or central divider 16. The two sub-passages thus formed are similar to the lateral major passages A and C and are accordingly each subdivided into two feeder passages by partitions 17 having their ends adjacent the inlet end curved toward the center of the dust laden stream, and thus slightly nearer to the central divider 16 than to the major partition 14 so as to equally distribute the dust of each of the sub-passages, to its pair of tubes.

The equality of division or distribution of the dust laden stream and the uniformity of suspension thereof is improved by curving all of the ends of the partition members 14, 15 and 17 (which are positioned eccentrically of the longitudinal axis of the casing) toward the center of the major dust stream. As set forth above the inertia or momentum of the dust particles tends to propel them in the same direction in which the main stream enters the distributor. Thus if no special provision were made to prevent it the greater part of the dust content of the central major stream B would pass into the distributors lying adjacent the partition 16 and only a lesser portion of the same would pass into the distributors between the partitions 17 and 14. However, by curving the partitions 14 as shown an eddy is formed adjacent that side of each of them facing the passage B which causes a turbulence in the stream which overcomes the effect of inertia upon the dust particles. To cause further turbulence and prevent any tendency toward non-uniformity of suspension in the several sub-divided streams which might cause deposits of the suspended matter against the walls of the sub-passages, particularly if the suspension comprises a sticky powder such as is frequently employed in plant dusters, I also curve inwardly the partitions 15 and 17, as shown.

The outlets 12 may be provided with any means for connecting thereto the distributing tubes or nozzles 18. In the form shown in the drawings these tubes 18 are merely clamped between the two half sections of the casing 10 by tightening the clamping means 13 by which the two half sections are held together. Obviously any other convenient form of connection might be used in different embodiments of this invention although the form illustrated is advantageous for its simplicity and cheapness of construction.

It is to be understood that for installations for feeding more or less than eight tubes, the arrangement of dividers will be accordingly modified. In practice, retaining always the fundamental concepts of this invention in mind, the distributors are designed and worked out along technical lines, and are perfected under actual operating conditions.

The uniform distribution of the dust laden stream from a fan or blower, insures the uniform application of one or more streams upon and around each plant, thus to provide uniform dust clouds completely enveloping the plants.

I accordingly wish to be limited only by the scope of the appended claims, construed as broadly as is warranted by the prior art.

I claim as new and desire to protect by Letters Patent:

1. A distributor for dusting apparatus including a fan shaped casing having an inlet at the small end and eight outlets at the peripheral edge thereof, said casing being formed of two half sections held together, a pair of long partitions extending from the peripheral edge of the fan shaped casing and toward the inlet end thereof, said partitions serving to divide the entering dust stream into one central and two lateral major streams, the central major stream being directly opposite the inlet of the casing to receive therefrom approximately one half of the entering stream, and the lateral major streams being positioned one on either side of the central major stream, to each receive approximately one-fourth of the entering stream, a partition dividing the central major stream into two equal sub-streams, partitions positioned for equally distributing each of said sub-streams between two of the outlets, and partitions positioned for equally distributing each of said lateral major streams between two of said outlets the inlet edges of the last mentioned group of partitions being spaced from the inlet edges of the first mentioned long partitions to provide turbulence chambers inwardly of the inlet edges of said long partitions.

2. A distributor for dusting apparatus including a fan shaped casing having an inlet at the small end and eight outlets at the peripheral edge thereof, means within the casing for distributing the entering stream into three major streams said means being so arranged that one of said major streams receives approximately one-half of the entering stream while each of the other of said major streams receives approximately one-quarter of said entering stream, means in said casing spaced substantially inwardly from the inlets of said first mentioned means for dividing said greater major stream into two equal sub-streams and further means spaced substantially inwardly from the inlets of said first-mentioned means for equally feeding two outlets from each of said sub-streams and smaller major streams.

3. A distributor for powder dusting machines and the like, comprising a fan shaped casing having an inlet at its smaller end, a partition (as 16) in alignment with said inlet, a curved partition (as 14) disposed at either side of said first named partition, said three partitions serving to divide the stream entering through said inlet into four streams of substantially equal pressure and dust content, and partitions (as 15 and 17) subdividing each of said four streams, the inlet edges of the last mentioned group of partitions being spaced from the inlet edges of the first mentioned long partitions to provide turbulence chambers inwardly of the inlet edges of said long partitions.

4. In a distributor for dusting apparatus, a fan-shaped casing having a stream inlet at its apex side and a plurality of outlets at its peripheral side, a plurality of partitions extending from the peripheral side, between outlets, nearly to the inlet presenting intakes to divide the stream into branch streams, the partitions as they extend from the peripheral side toward the inlet being gathered together toward the center axis of the inlet so as to present progressively smaller intakes from the sides of said casing toward said axis to compensate for inertia of the dust particles by which they seek to travel straight forward from the inlet into the more central intakes.

5. The arrangement described in claim 4, the casing being parted in a plane which includes the center of the inlet and the centers of the outlets.

In testimony whereof I have signed my name to this specification.

GEORGE S. MESSINGER.